(12) United States Patent
Damaraju et al.

(10) Patent No.: US 7,689,772 B2
(45) Date of Patent: Mar. 30, 2010

(54) POWER-PERFORMANCE MODULATION IN CACHES USING A SMART LEAST RECENTLY USED SCHEME

(75) Inventors: Satish Damaraju, El Dorado Hills, CA (US); Subramaniam Maiyuran, Gold River, CA (US); Truyen Trinh, Elk Grove, CA (US); Parag Raval, Folsom, CA (US); Peter Smith, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 11/418,883

(22) Filed: May 4, 2006

(65) Prior Publication Data

US 2007/0260818 A1    Nov. 8, 2007

(51) Int. Cl.
G06F 12/00 (2006.01)
G06F 13/00 (2006.01)

(52) U.S. Cl. ............... 711/128; 711/100; 711/118; 711/154

(58) Field of Classification Search ........... 711/100, 711/117, 118, 128, 154
See application file for complete search history.

(56) References Cited

U.S. PATENT DOCUMENTS

| | | | | |
|---|---|---|---|---|
| 4,899,275 | A | * | 2/1990 | Sachs et al. ............ 711/3 |
| 5,551,011 | A | * | 8/1996 | Danby et al. ............ 703/6 |
| 5,870,616 | A | * | 2/1999 | Loper et al. ............ 713/324 |
| 6,578,138 | B1 | | 6/2003 | Kyker et al. |
| 6,594,728 | B1 | * | 7/2003 | Yeager ............ 711/127 |
| 7,177,981 | B2 | | 2/2007 | Davis |
| 7,353,337 | B2 | * | 4/2008 | Wester et al. ............ 711/125 |
| 2002/0129201 | A1 | | 9/2002 | Maiyuran et al. |
| 2006/0143382 | A1 | | 6/2006 | Damaraju et al. |
| 2007/0081377 | A1 | * | 4/2007 | Zheng et al. ............ 365/96 |
| 2007/0113013 | A1 | * | 5/2007 | Knoth ............ 711/128 |

FOREIGN PATENT DOCUMENTS

CN   1545035 A   11/2004

* cited by examiner

Primary Examiner—Tuan V. Thai
(74) Attorney, Agent, or Firm—Caroline M. Fleming (57) ABSTRACT

The number of ways in an N-way set associative sequential cache is modulated to trade power and performance. Way selection is restricted during the allocation based on address so that only a subset of the N-ways is used for a range of addresses allowing the N-ways that are not in use to be powered off.

24 Claims, 7 Drawing Sheets

POWER-PERFORMANCE MODULATION IN CACHES USING A SMART LEAST RECENTLY USED SCHEME

FIELD

The present invention relates generally to memory devices, and more particularly to cache memories.

BACKGROUND

High power dissipation limits processor performance both in mobile and desktop computer systems. Dissipated power in a processor has a direct correlation to the battery life of a mobile computer system. Limiting any useless activities or sacrificing marginal performance gain can save energy and extend the battery life. To contain system costs, most computer systems use throttling schemes or run the processor in a reduced frequency and voltage mode to extend battery life.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A processor typically includes internal cache for storing frequently used data values. The internal cache increases performance of the processor by reducing accesses to external memory to retrieve data values and instructions. However, as the amount of internal cache memory included in a processor increases, the power consumed by the processor also increases.

The cache is typically smaller and faster than main memory and stores copies of data from the most frequently used main memory locations. The address space of the cache is divided into cache lines, with a cache line size usually larger than the size of a main memory access.

The cache line size is the smallest unit of memory than can be transferred between main memory and the cache. A cache line typically stores a plurality of words to take advantage of locality of references, that is, if one location is read then following locations are likely to be read soon afterwards. Each location in main memory and cache has an associated index or address. Each location in cache has an associated tag for storing the index of the cache line in main memory that is also stored in the cache.

When reading or writing from/to an address in main memory, the cache is checked first by comparing a portion of the main memory address to all tags stored in the cache to determine if the address is stored in the cache. If there is a match, there is a cache hit. If not, there is a cache miss. Typically, on a cache miss, a new entry is allocated in cache for the missed address, and the tag and copy of the data read from main memory are then stored in the cache.

In an N-way set associative cache, the address space is divided into blocks of cache locations which are the cache line size. The cache locations (cache lines) are grouped into sets, with each set having N cache locations or ways. After finding the appropriate set for a given address, a cache location of the cache line size is found within the set. There are N locations in cache in which any particular location in main memory can be cached. A tag stored with each entry in an associative cache is read to determine which entry of the cache to select for a particular main memory address. An N-way set associative cache typically reads all N tags and N data stored in the cache in parallel and chooses the data associated with the matching tag.

When all the cache locations are full, one of the elements in the set needs to be flushed (evicted) to make room for a new element. There are many replacement policies for selecting the element to be flushed. One well-known replacement policy replaces an element in an N-way associative cache based on the pseudo-Least Recently Used (LRU) algorithm. The pseudo-LRU algorithm traverses a binary search tree to find a pseudo-LRU element, that is, an element that most likely has not been accessed very recently, given a set of elements and a sequence of access events to the elements. Each node of the binary search tree has an associated one-bit flag that indicates the direction (right or left) that the search should continue. The binary tree is traversed according to the values of the flags to find a pseudo-LRU element with each flag being updated during the traversal by setting the flag to the opposite direction to the direction taken.

The replacement policy also selects where a copy of a main memory location is stored in the cache. The selection of a cache memory location in which to store the copy of the main memory location may use some of the bits of the memory location's index. For example, the least significant bits of the memory location's index may be used as the index for cache memory. Using a portion of the memory location's index to select the cache entry reduces the number of main memory address bits stored in the tag.

An embodiment of the present invention provides a method for reducing power consumption in an N-way set associative sequential cache. The deterministic nature of a sequential cache may be used to reduce power consumption by selecting a subset of the available ways or banks and selecting an LRU cache entry within the selected subset. In a sequential cache, data within the cache is sequentially stored and accessed in a predetermined manner. For example, an instruction cache is a sequential cache, with instructions stored in a static order defined by a program. Another example of a sequential cache is a trace cache in which instructions are stored in order of execution either after they have been decoded or as they are retired.

Figure 1:
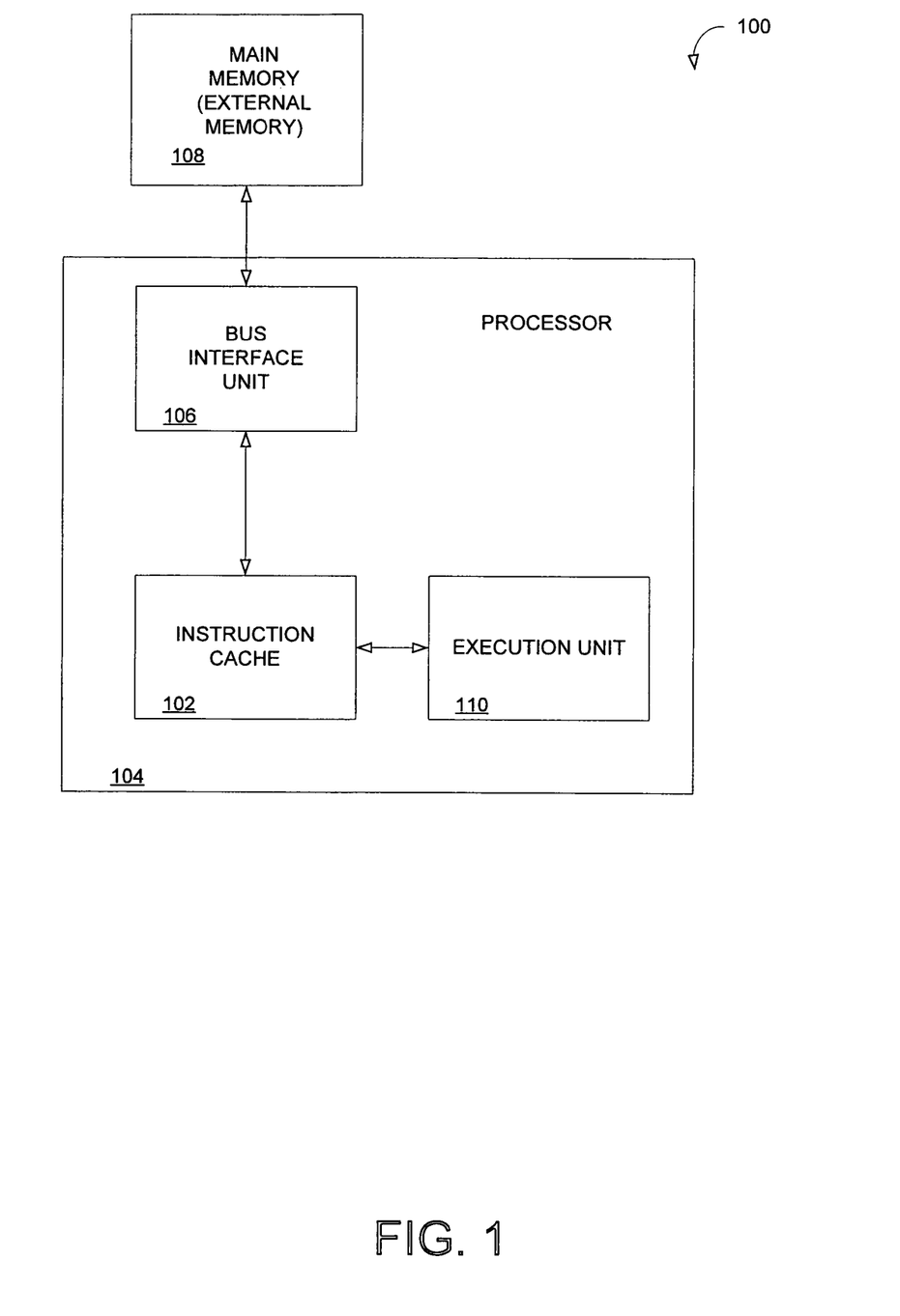
FIG. 1 is a block diagram of a system that includes an instruction cache which may be configured as a scalable N-way set associative cache according to the principles of the present invention.

FIG. 1 is a block diagram of a system 100 that includes an instruction cache 102 which may be configured as a scalable N-way set associative cache according to the principles of the present invention. A processor 104 includes a bus interface unit 106 for communicating with main memory (external memory) 108 and instruction cache 102 for storing instructions fetched by the bus interface unit 106 from main memory 108. The processor also includes an execution unit 110 coupled to the instruction cache 102 which executes instructions fetched from the instruction cache 102. The main memory 108 may be Rambus Dynamic Random Access Memory (RDRAM), Double Data Rate Dynamic Random Access Memory (DDR RAM), Synchronous Dynamic Random Access Memory (SDRAM) or any similar type memory.

By storing frequently used data values in the instruction cache 102, performance of the processor 104 is increased by reducing accesses to external memory 110 to retrieve instructions. An embodiment of the invention will be described for an 8-way set-associative instruction cache. However, the invention is not limited to an 8-way set-associative instruction cache. The invention can be used with any N-way set associative sequential cache that uses a pseudo Least Recently Used (LRU) algorithm.

Memory may be divided into separately addressable blocks commonly referred to as banks. Based on address, access to the banks may be interleaved such that only one bank is directly accessible at a time. Thus, power consumption may be reduced in a cache by distributing the cache locations or ways in a set over a plurality of separate banks, with one cache location for a set stored in each bank.

Figure 2:
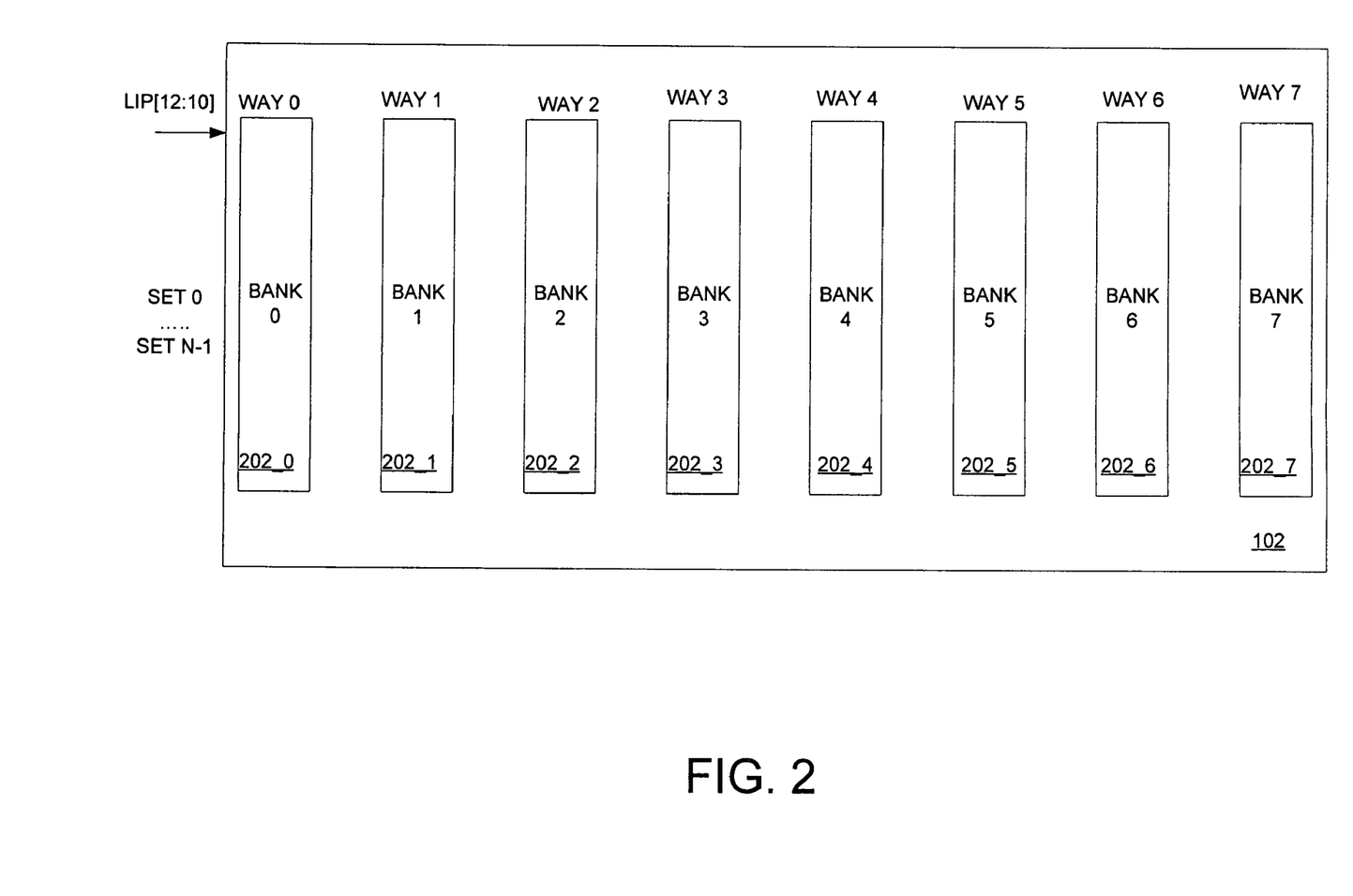
FIG. 2 is a block diagram illustrating the instruction cache shown in FIG. 1 subdivided into 8 banks.

FIG. 2 is a block diagram illustrating the instruction cache 102 shown in FIG. 1 subdivided into 8 banks. The instruction cache 102 is configured in non-power saving mode for an 8-way set associative cache.

While not shown in FIG. 2, each bank of the instruction cache 102 may include additional circuitry, including decoder circuitry, sense circuitry, and other control circuitry. The decoder circuitry may be used to decode address information to determine a selected set of a given bank, while sense circuitry may be used to sense the data of the selected set. The control circuitry may be used to enable write and read operations within the bank.

Each of the eight memory banks 202_0, . . . , 202_7 is capable of storing one way for each of N sets. For example, way 0 for sets 0 through n−1 is stored in bank 0 and way 7 for sets 0 through n−1 is stored in bank 7. The way information stored in each bank is time critical due to the time required for tag comparison. Thus, tag comparison may be performed in parallel on all 'ways', that is, in each of the eight banks to determine the bank that stores the cache entry.

As there are eight separate ways (banks), each of the eight banks stores one element of a particular set. In order to select the bank in which the LRU element of a particular set is stored, the pseudo-LRU algorithm maintains a seven bit LRU vector (LRU[0]-LRU[6]). The state of each of the LRU bits is checked starting with LRU[0], to determine which of the eight banks to select.

TABLE 1

| LRU BITS | | | | | | | |
|---|---|---|---|---|---|---|---|
| 0 | 1 | 2 | 3 | 4 | 5 | 6 | BANK |
| 0 | 1 | X | 0 | X | X | X | 0 |
| 0 | 1 | X | 1 | X | X | X | 1 |
| 0 | 0 | X | X | 0 | X | X | 2 |
| 0 | 0 | X | X | 1 | X | X | 3 |
| 1 | X | 0 | X | X | 0 | X | 4 |
| 1 | X | 0 | X | X | 1 | X | 5 |
| 1 | X | 1 | X | X | X | 0 | 6 |
| 1 | X | 1 | X | X | X | 1 | 7 |

As shown in Table 1, the state of LRU[0] determines whether a bank is selected from the group of banks 0-3 or from the group of banks 4-7. A bank is selected from the group of banks 0-3 if LRU[0] is '0' and from the group of banks 4-7 if LRU[0] is '1'. Even though the state of LRU[0] selects one of two groups of banks, all of the banks must be powered on because based on the pseudo LRU algorithm, after an element to overwrite (evict) has been selected, the other group of banks will be selected for selecting the next element to overwrite.

Figure 3:
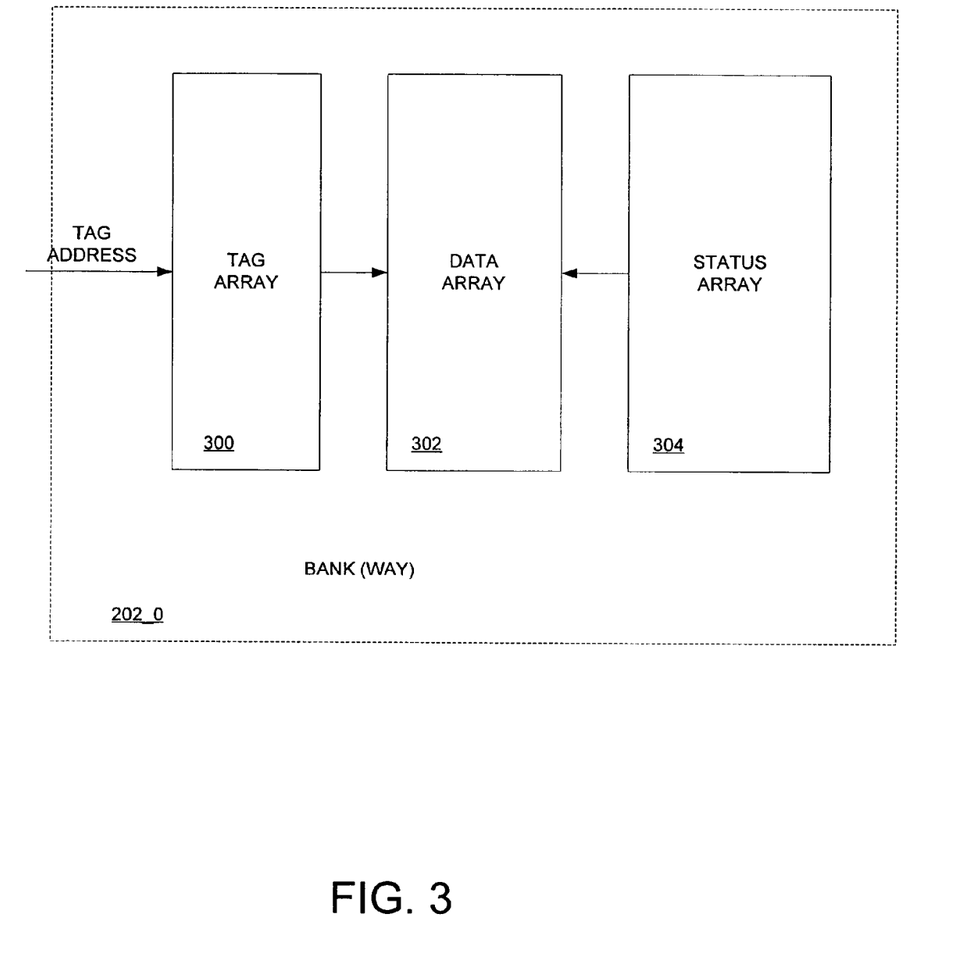
FIG. 3 is a block diagram of an embodiment of any one of the banks shown in FIG. 2.

FIG. 3 is a block diagram of an embodiment of one of the banks 202_0 shown in FIG. 2. The bank 202_0 includes a tag array 300, a data array 302 and a status array 304. The data array 302 stores the data that is stored in the cache line. The tag array 300 stores the tag portion of the address corresponding to the cache line. The status array 304 stores an indication as to whether an entry in the cache is valid. The data array 302 and tag array 300 are relatively large and thus a big portion of the power for each bank is consumed by these arrays.

Typically, a physical memory address includes a tag, set index and an offset. The set index is used to select the set and the offset is used to select the byte or word within the set. The tag bits are compared with the tag bits stored in the tag array corresponding to the entry to determine if the data for the physical memory address is stored in the cache, that is, if there is a cache hit.

Figure 4:
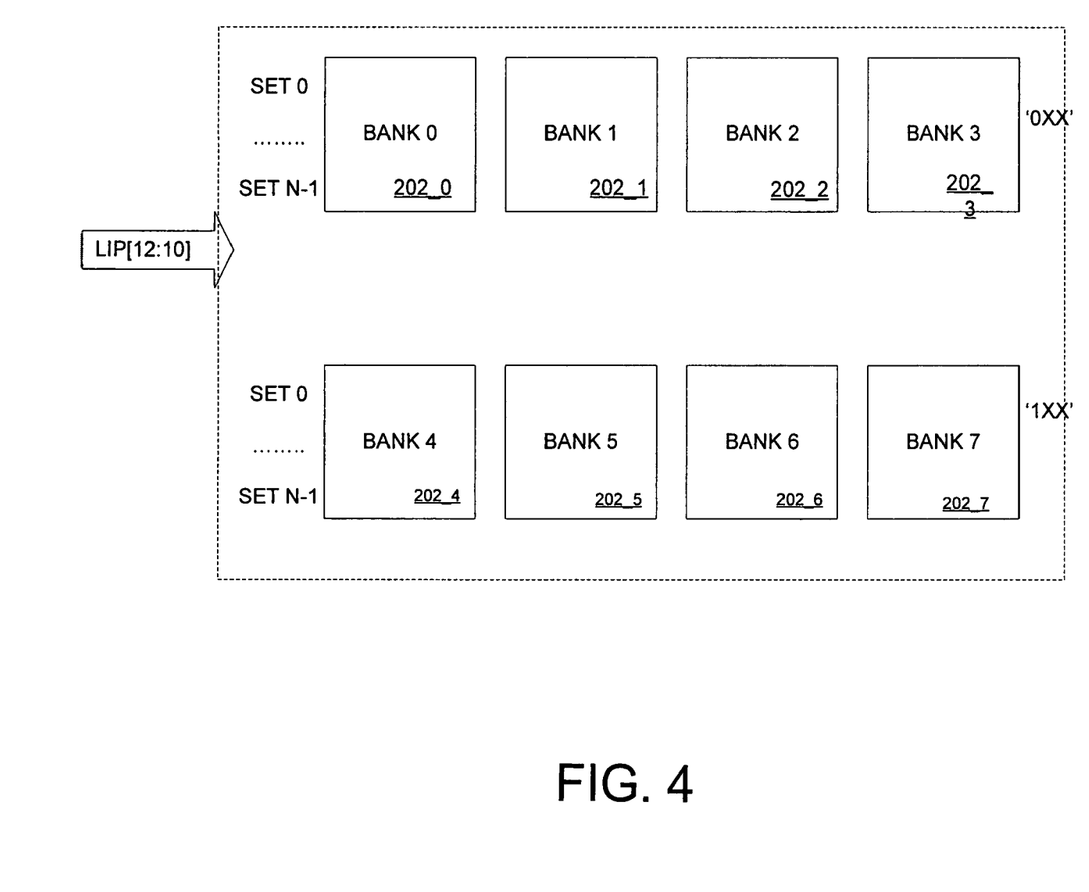
FIG. 4 is a block diagram illustrating an embodiment of a scalable 8-way banks assignment configured as 4-way set associative cache according to the principles of the present invention.

FIG. 4 is a block diagram illustrating an embodiment of a scalable 8-way set associative configured as 4-way set associative cache according to the principles of the present invention. The number of ways that are active is modulated to trade power against performance. The modulation of the ways does not involve any physical change to the cache structure and allows the same die to be used for multiple market segments, for example, as an 8-way set associative cache for high performance servers and as a 4-way set associative cache for mobile systems.

The modulation of the number of ways may be performed by a modified pseudo Least Recently Used (LRU) algorithm by restricting way selection during allocation. In the embodiment shown, although there are 8 ways, at anytime only half of the ways (banks) of cache are active and the data array, tag array and status array in the other 4 banks may be powered off. This reduces the power consumption by about half with negligible loss in performance.

In the 8-way associative cache embodiment shown, through a programmable mode, high end workstations can use all of the 8-ways and mobile and ultra low power segments may use only a subset of the banks (ways), for example, 4, 2 or 1 way. In one embodiment, the programmable mode is an enable/disable bit.

The number of ways is modulated to trade power against performance by restricting selection to a subset of the N-ways during allocation. Only a selectable subset of the ways of the cache is active and the other set(s) may be powered down to reduce power consumption.

In an embodiment, a 32K instruction cache has 64 sets of 8 ways, with each way having a 64 byte cache line. Each of the 8 ways is implemented as a bank with each bank having a tag array, a data array and a status array as discussed in conjunction with FIG. 3. The 64 bytes of data for the cache line is stored in the data array. 32 bits of Linear Instruction Pointer (LIP) constitute the tag portion and are stored in the tag array and 6 bits of the LIP are used to select one of the 64 sets. As each cache line is 64 bytes, the six least significant bits of the LIP (LIP[5]-LIP[0]) may be ignored when selecting a set.

An embodiment of the invention applies to any sequential cache, that is, a cache that is accessed in a sequential manner, for example, instruction cache or trace cache. An instruction cache is a fast local memory that stores instructions to be executed. Typically, the instruction cache stores a stream of instructions. A stream of instructions to be executed by a processor exhibits high spatial locality when sequential sections of code are executed. Spatial locality is the concept that the likelihood of referencing data is higher if data near it was just referenced. The stream also exhibits high spatial and temporal locality when loops are encountered in the code. Temporal locality is the likelihood that data that is referenced at one point in time will likely be referenced again sometime in the near future.

Instead of using the least significant bit of the LRU vector to select a subset of the N-ways, a range of addresses identified by a portion of the linear instruction pointer is used. In the embodiment shown LIP[12] is used to select one set of four ways in an 8 way set associative instruction cache. As the instruction cache is typically accessed sequentially due to the nature of the storage of instructions in memory, it is likely that the next instruction to be accessed will be in the same subset of ways. Thus, the other set of ways may be powered off to save power consumption while the first subset of ways which is selected based on the state of LIP[12] is powered on. For particular addresses, only four ways in an 8-way set associative cache are accessed consistently and the other four ways may be powered off.

As shown in the embodiment in FIG. 4, instead of using the LRU[0] bit, LIP[12] is used to select a subset of ways based on a range of addresses identified by the state of LIP[12]. When LIP[12] is '1', that is, LIP[12:10] is '1XX', ways 4-7 (banks 4-7 202_3, . . . 202_6) are enabled. When LIP[12] is '0', that is LIP[12:10] is '0XX', ways 0-3 (banks 0-3 202_0, . . . 202_2) are enabled. At any time, LIP can be either '0' or '1' so only one of two subsets of "4 ways" is selected (enabled) at any given time. For a particular addressing scheme, 4 ways may be accessed consistently.

In contrast to a pseudo LRU algorithm that uses LRU[0] to select one of the plurality of ways and is updated during traversal by setting it to the opposite state, the set of ways are selected based on one of the address bits in the linear instruction pointer.

The use of the linear instruction pointer to select a subset of the N-ways avoids physical changes to the cache structure. Instead, the selection is restricted during the allocation based on a range of addresses, through the use of the linear instruction pointer. The power saving applies to the data array, tag array and status array in the way. The data array, tag array and status array can be powered down in each of the ways of the subset of the N-ways for the ways that are not currently active.

Returning to FIG. 3, power to each of the tag array 300, data array 302 and status array 304 in a bank 202_0 can be controlled through separate control signals. In one embodiment the control signal that turns on and off the tag array 300 and the status array 304 is qualified with LIP[12] so when 4-way mode is enabled in the 8-way set associative cache based on the state of LIP[12], power to the tag arrays 300 and status arrays 304 in the 4 non-selected ways is off.

The control signal that turns on and off the data array is qualified with a way enable signal output from the tag array 300 in each way (bank) and thus, the data array for the non-selected ways is also turned off resulting in additional power savings.

Figure 5:
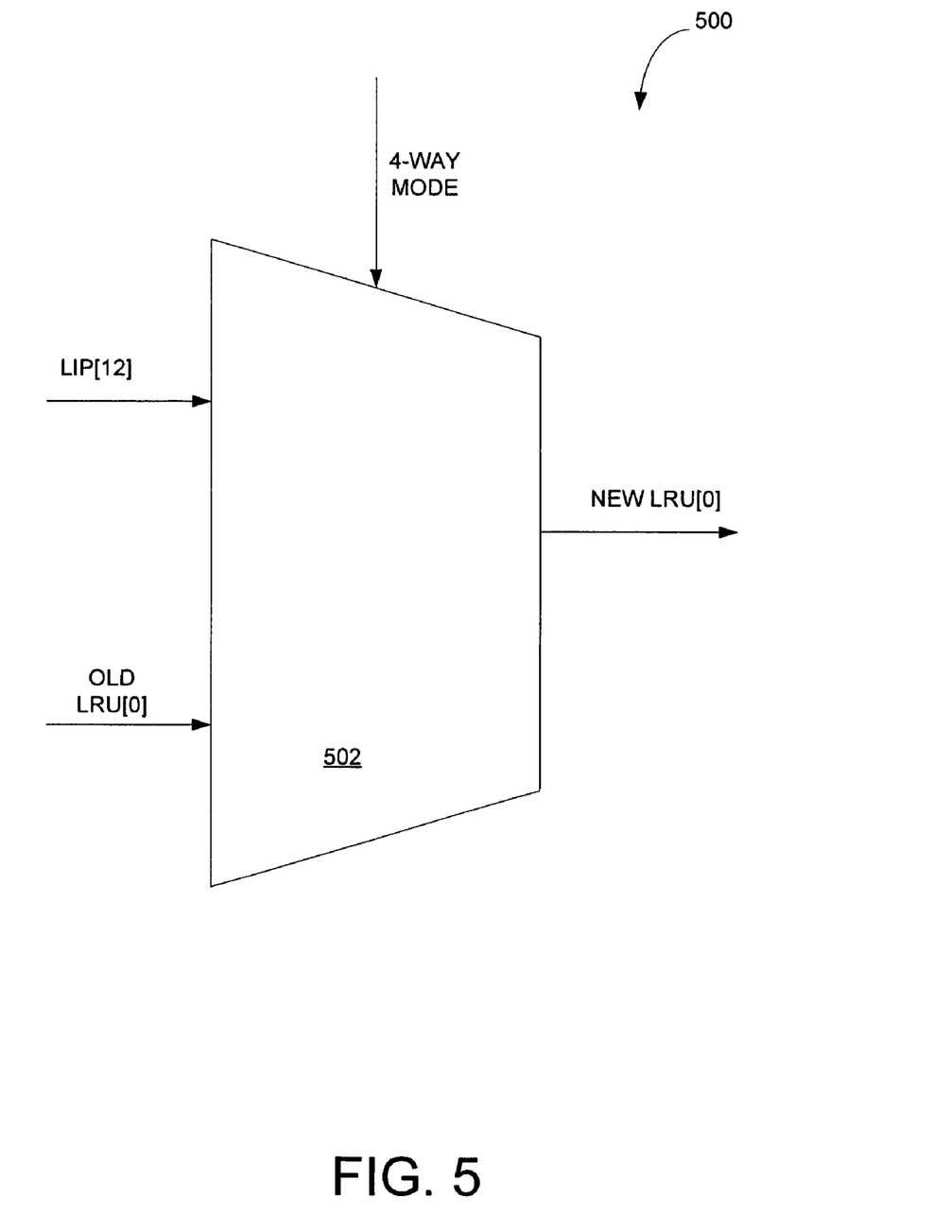
FIG. 5 is an embodiment of a way selector for configuring the scalable 8-way banks assignment as a 4-way set associative cache.

FIG. 5 is an embodiment of a way selector 500 for configuring the scalable 8-way banks assignment as a 4-way set associative cache. In the embodiment shown, the way selector includes a 2:1 multiplexer 502. The multiplexer 502 selects either old LRU[0] or LIP[12] to forward as new LRU[0] for use by the pseudo LRU algorithm based on the state of the 4-way enable. This allows the old LRU[0] to be forwarded as new LRU[0] if the cache is configured as an 8-way associative cache and LIP[12] to be forwarded as new LRU[0] if the cache is configured as a 4-way set associative cache.

Figure 6:
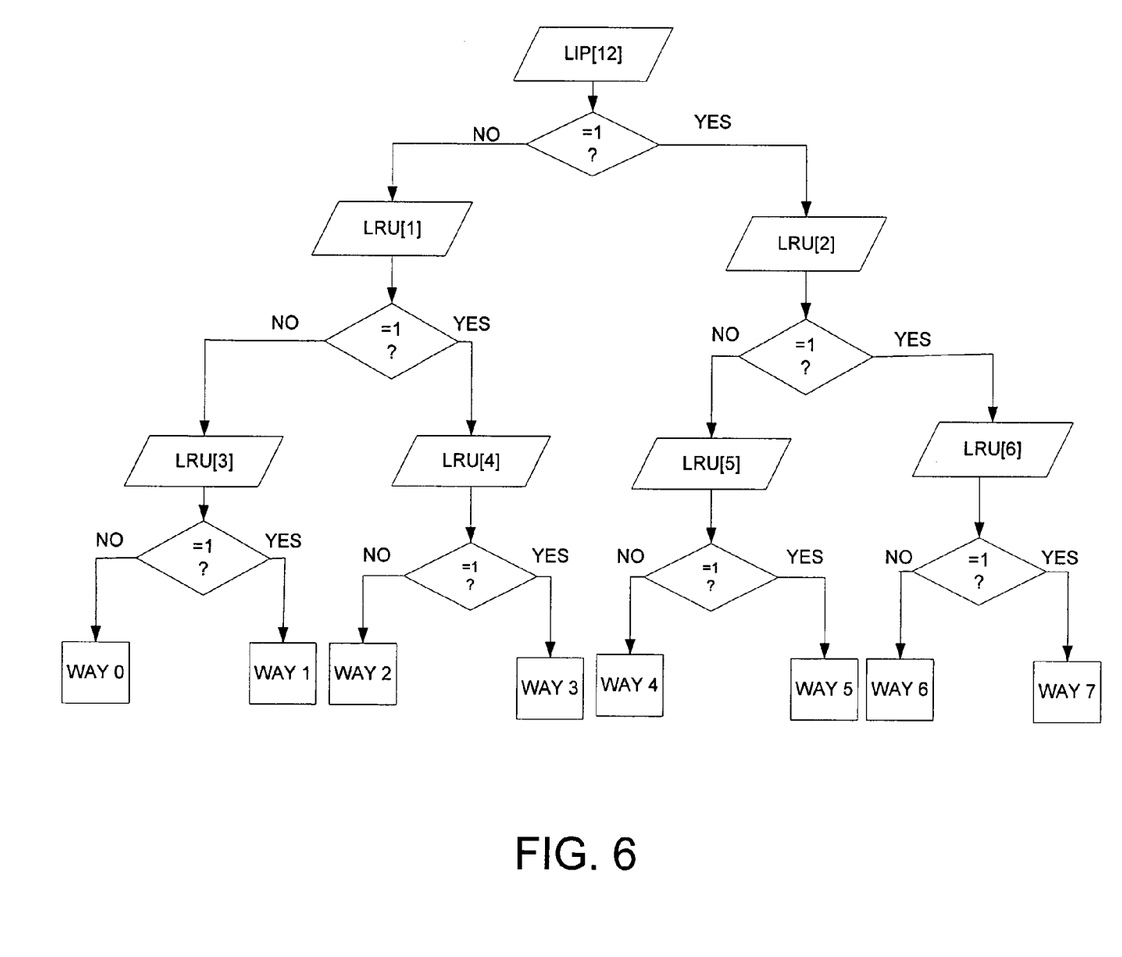
FIG. 6 illustrates an embodiment of a 8-way smart pseudo LRU.

FIG. 6 illustrates an embodiment of a 8-way smart pseudo LRU. As shown, the state of LIP[12] is used to determine whether the subset of ways that includes way 0, way 1, way 2 and way 3 or the subset of ways that includes way 4, way 5, way 6 and way 7 are enabled. After the state of LIP[12] has selected a subset of ways, LRU[6]-LRU[1] are used to select a way from the selected subset.

Figure 7:
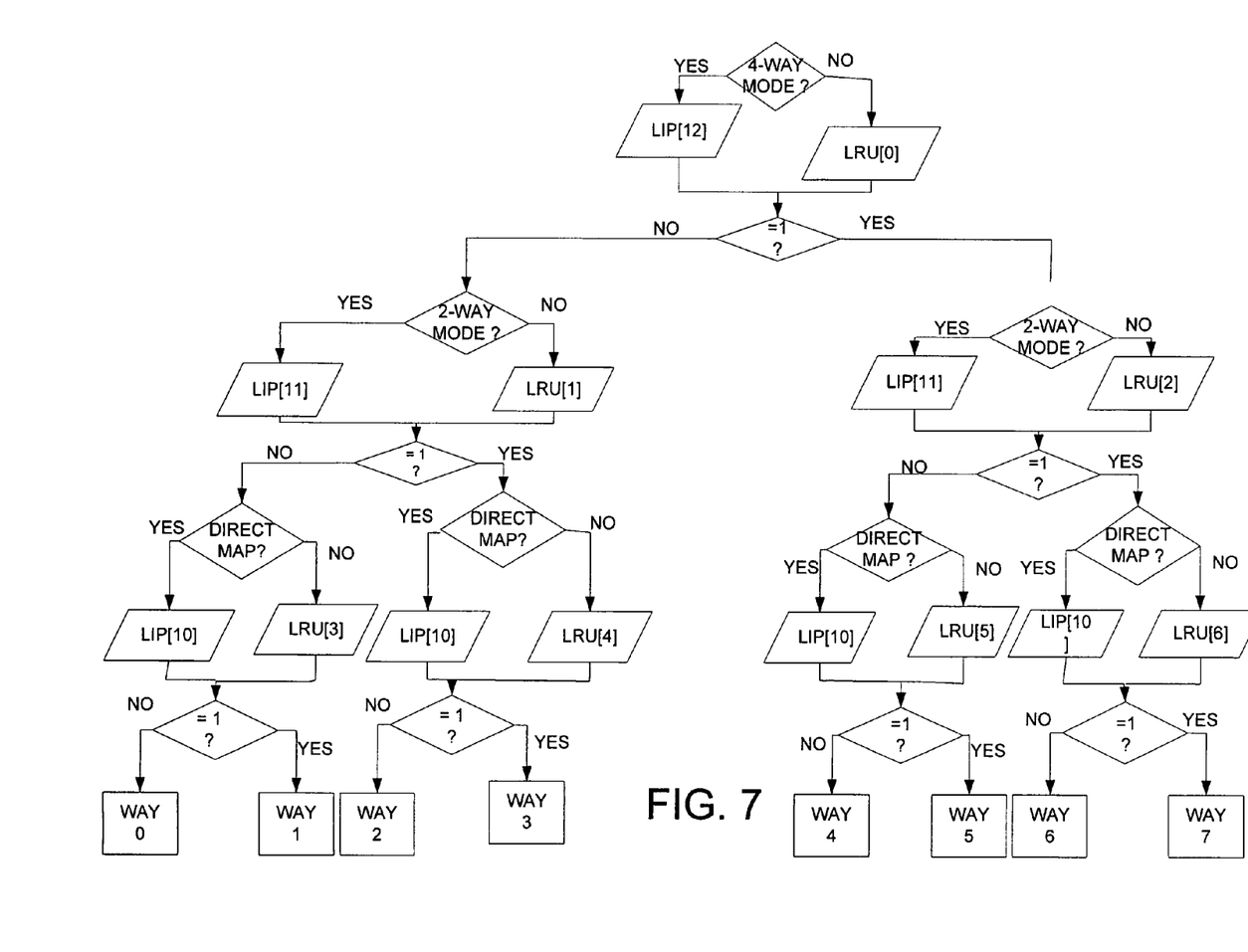
FIG. 7 illustrates an embodiment of a scalable 8-way smart pseudo LRU.

FIG. 7 illustrates an embodiment of a scalable 8-way smart pseudo LRU. In the embodiment shown, the subset of N-ways that may be powered off may be extended through the use of additional bits of the linear instruction pointer (LIP). In the scalable method, the 8-way set associative cache may be modified to a 4-way set associative cache using 4 of the 8 available ways, to a 2-way set associative cache using 2 of the 8 available ways or as a 1-way direct mapped cache using one of the 8 available ways For example, when "2-way mode" is selected, the cache becomes four "2-way" caches (or virtually 256 sets and 2 ways) and finally when "direct map" mode is selected, the cache becomes eight "1-way" caches. As discussed earlier, the data and tag arrays for specific ways may be powered down in the cache based on the selected mode of operation.

For example, in "2-way mode", 6 of the ways can be powered off for data, tag and status array thus saving significant power. The truth table using LIP[12], [11], [10] is shown in Table 2 for illustrates the ways that are used for different modes.

TABLE 2

| LIP[12] | LIP[11] | LIP[10] | Ways | Mode |
|---|---|---|---|---|
| 1 | X | x | 4-7 | 4-way mode |
| 0 | X | x | 0-3 | 4-way mode |
| 0 | 0 | x | 0-1 | 2-way mode |
| 0 | 1 | x | 2-3 | 2-way mode |
| 1 | 0 | x | 4-5 | 2-way mode |
| 1 | 1 | x | 6-7 | 2-way mode |
| 0 | 0 | 0 | 0 | direct mapped |
| 0 | 0 | 1 | 1 | direct mapped |
| 0 | 1 | 0 | 2 | direct mapped |
| 0 | 1 | 1 | 3 | direct mapped |
| 1 | 0 | 0 | 4 | direct mapped |
| 1 | 0 | 1 | 5 | direct mapped |
| 1 | 1 | 0 | 6 | direct mapped |
| 1 | 1 | 1 | 7 | direct mapped |

In the embodiment shown, higher order address bits in the linear instruction pointer, that is, LIP[12-10] are used to select the ways that are used because use of these address bits does not affect the sequential order of the cache.

In "4-way mode" only 4 ways of data, tag and status are being used and the remaining ways may be powered off. In one embodiment the cache may be an on-die cache, that is, on the same die as a processor.

In this embodiment, the way selector 500 described in conjunction with FIG. 5 is modified to select whether LIP[11:10] are forwarded to the pseudo LRU algorithm dependent on whether the mode selected is 2-way or direct mapped. For example, when 2-way mode is selected, LIP[12] is used to select a range of addresses to be stored in ways 0-3 or ways 4-7 and dependent on the state of LIP[12], LIP[11] is used to select between ways 0-1, ways 2-3, ways 4-5 and ways 6-7.

In another embodiment, a programmable (de-feature) mode bit in a control register may be used to allow a set of the ways to be turned on/off. The de-feature bit allows the same processor to be used in different types of systems, such as, a desktop, a mobile system and a server. For example, the ability to turn power on or off, for a set of ways may be enabled in a processor used for a mobile system in which power saving is more important than the performance.

By reducing the cache from one 8 way set associative cache to two 4-way set associative cache the performance loss is negligible. The performance loss increases due to cache misses as the number of ways is decreased. However, a trade-off can be made between power and performance.

In yet another embodiment, the programmable mode, for example, 4-way mode shown in FIG. 5, may be implemented by a fuse bit allowing the mode to be permanently set in order to allow an 8-way set associative cache to be operated permanently as a 4-way set associative cache to provide a lower power processor.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

What is claimed is:

1. An apparatus comprising:
an N-way set associative sequential cache; and
a way selector coupled to the N-way set associative sequential cache, the way selector to direct access for a range of addresses to a subset of N-ways in the N-way set associative sequential cache, the subset of N-ways allocated to the range of addresses;
wherein a portion of high order bits of a linear an instruction pointer is used to select the subset of N-ways, the portion of high order bits selected based on the sequential order of the cache.

2. The apparatus of claim 1, wherein N-ways in the N-way set associative sequential cache are modulated to trade power against performance by restricting selection during allocation of a Least Recently Used (LRU) entry to only the selected subset of N-ways.

3. The apparatus of claim 2, wherein non-selected ways are powered down.

4. The apparatus of claim 1, wherein the way selector directs access based on one of plurality of modes.

5. The apparatus of claim 4, wherein a selected one of the plurality of modes is programmable.

6. The apparatus of claim 1, wherein the way selector directs access based on state of a fuse.

7. The apparatus of claim 1, wherein the sequential cache is an instruction cache.

8. The apparatus of claim 1, wherein the subset of N-ways is searched for a least recently used entry.

9. The apparatus of claim 1, wherein the subset of N-ways is N/2.

10. The apparatus of claim 1, wherein the subset of N-ways is N/4.

11. A method comprising:
providing an N-way set associative sequential cache; and
directing access for a range of addresses to a subset of N-ways in the N-way set associative sequential cache, the subset of N-ways allocated to the range of addresses;
wherein high order bits of a linear a instruction pointer is used to select the subset of N-ways, the portion of high order bits selected based on the sequential order of the cache.

12. The method of claim 11, further comprising:
modulating N-ways in the N-way set associative sequential cache to trade power against performance by restricting selection to the subset of N-ways during allocation.

13. The method of claim 12, wherein non-selected ways are powered down.

14. The method of claim 11, further comprising:
limiting access to the subset of N-ways based on one of a plurality of modes.

15. The method of claim 14, wherein a selected one of the plurality of modes is programmable.

16. The method of claim 11, further comprising:
limiting access to the subset of N-ways based on state of a fuse.

17. The method of claim 11, wherein the sequential cache is an instruction cache.

18. The method of claim 11, further comprising:
searching the subset of N-ways for a least recently used entry.

19. The method of claim 11, wherein the subset of the N-ways is N/2.

20. The method of claim 11, wherein the subset of the N-ways is N/4.

21. An article including a computer readable storage medium having associated information, wherein the information, when accessed, results in a machine performing:
providing an N-way set associative sequential cache; and
directing access for a range of addresses to a subset of N-ways in the N-way set associative sequential cache, the subset of N-ways allocated to the range of addresses;
wherein high order bits of a linear instruction pointer is used to select the subset of N-ways, the portion of high order bits selected based on the sequential order of the cache.

22. The article of claim 21, wherein the sequential cache is an instruction cache.

23. A system comprising:
a Dynamic Random Access memory; and
a processor coupled to the Dynamic Random Access memory, the processor comprising:
an N-way set associative sequential cache; and
a way selector coupled to the N-way set associative sequential cache, the way selector to direct access for a range of addresses to a subset of N-ways in the N-way set associative sequential cache, the subset of N-ways allocated to the range of addresses;
wherein a portion of high order bits of a linear instruction pointer is used to select the subset of N-ways, the portion of high order bits selected based on the sequential order of the cache.

24. The system of claim 23, wherein the sequential cache is an instruction cache.

* * * * *